US012046462B2

(12) United States Patent
Oshikawa

(10) Patent No.: US 12,046,462 B2
(45) Date of Patent: Jul. 23, 2024

(54) IMAGING MASS SPECTROMETRY DATA PROCESSING DEVICE

(71) Applicant: SHIMADZU CORPORATION, Kyoto (JP)

(72) Inventor: Tomonori Oshikawa, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 790 days.

(21) Appl. No.: 17/054,833

(22) PCT Filed: May 30, 2018

(86) PCT No.: PCT/JP2018/020838
§ 371 (c)(1),
(2) Date: Nov. 12, 2020

(87) PCT Pub. No.: WO2019/229902
PCT Pub. Date: Dec. 5, 2019

(65) Prior Publication Data
US 2021/0217597 A1 Jul. 15, 2021

(51) Int. Cl.
*H01J 49/00* (2006.01)

(52) U.S. Cl.
CPC ................................ *H01J 49/0004* (2013.01)

(58) Field of Classification Search
CPC .................................................. H01J 49/0004
See application file for complete search history.

(56) References Cited

U.S. PATENT DOCUMENTS 9,230,784 B2 * 1/2016 Morimoto ........... H01J 49/0027
2006/0157647 A1 * 7/2006 Siuzdak .............. G01N 30/463
324/307

(Continued)

FOREIGN PATENT DOCUMENTS

CN 102077086 A 5/2011
CN 102194640 A 9/2011

(Continued)

OTHER PUBLICATIONS

Chughtai et al., Mass Spectrometric Imaging for biomedical tissue analysis, May 2, 2010, Chem Rev., 110(5), pp. 3237-3277. doi: 10.1021/cr100012c (Year: 2010).*

(Continued)

*Primary Examiner* — Mischita L Henson
(74) *Attorney, Agent, or Firm* — Sughrue Mion, PLLC

(57) ABSTRACT

After collecting mass spectrometry data for each of a large number of measurement points in the two-dimensional region on the sample with the imaging mass spectrometry unit, the user inputs the target compound whose two-dimensional distribution is desired to be observed from the input unit. The image display instruction reception unit obtains the m/z range for data integration from the precise m/z value and the allowable width of m/z for each target compound. The mass-to-charge ratio range overlap determination unit determines the presence or absence of overlap between the m/z ranges of a plurality of compounds, and if there is an overlap, the overlap determination result processing unit creates and displays on the screen of the display unit a list of compounds whose m/z ranges overlap, for example. This urges the user to review the compounds and allowable values.

6 Claims, 3 Drawing Sheets

(56) References Cited

U.S. PATENT DOCUMENTS

| | | | | |
|---|---|---|---|---|
| 2010/0213363 | A1* | 8/2010 | Nakajima | H01J 41/10 250/281 |
| 2011/0127425 | A1 | 6/2011 | Kajihara | |
| 2011/0216952 | A1 | 9/2011 | Kajihara | |
| 2016/0025691 | A1* | 1/2016 | Taneda | G01N 30/72 702/23 |
| 2017/0032947 | A1* | 2/2017 | Kobayashi | H01J 49/005 |
| 2019/0115200 | A1 | 4/2019 | Harada | |

FOREIGN PATENT DOCUMENTS

| | | | |
|---|---|---|---|
| JP | 2009-14476 | A | 1/2009 |
| WO | 2017/183086 | A1 | 10/2017 |

OTHER PUBLICATIONS

"IMScope TRIO Imaging Mass Microscope", [online], [Searched on Mar. 16, 2018], Shimadzu Corporation, Internet.
International Search Report of PCT/JP2018/020838 dated Jul. 17, 2018 [PCT/ISA/210].
Written Opinion of PCT/JP2018/020838 dated Jul. 17, 2018 [PCT/ISA/237].
Communication dated Mar. 22, 2023, issued in Chinese Application No. 201880093342.9.
Chinese Office Action dated Jan. 25, 2024 in Application No. 201880093342.9.
Second Office Action dated Sep. 2, 2023 issued for the corresponding Chinese Patent Application No. 201880093342.9.
Communication dated Apr. 26, 2024, issued in Chinese Application No. 201880093342.9.

* cited by examiner

Fig. 3A
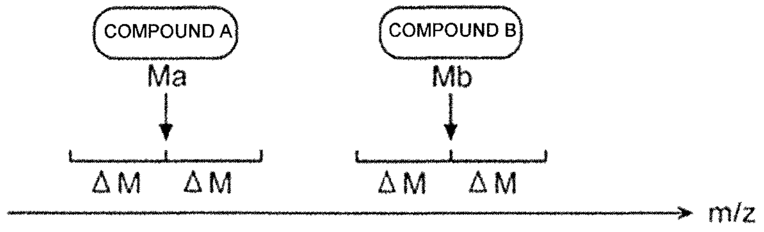
Fig. 3B
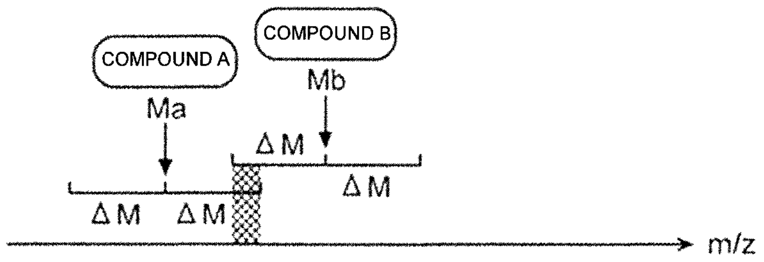
Fig. 4
300
| COMPOUND NAME | m/z VALUE | ALLOWABLE WIDTH | m/z RANGE |
|---|---|---|---|
| COMPOUND A | 1092 | 1 | 1091-1093 |
| COMPOUND B | 1093 | 1 | 1092-1094 |
Fig. 5
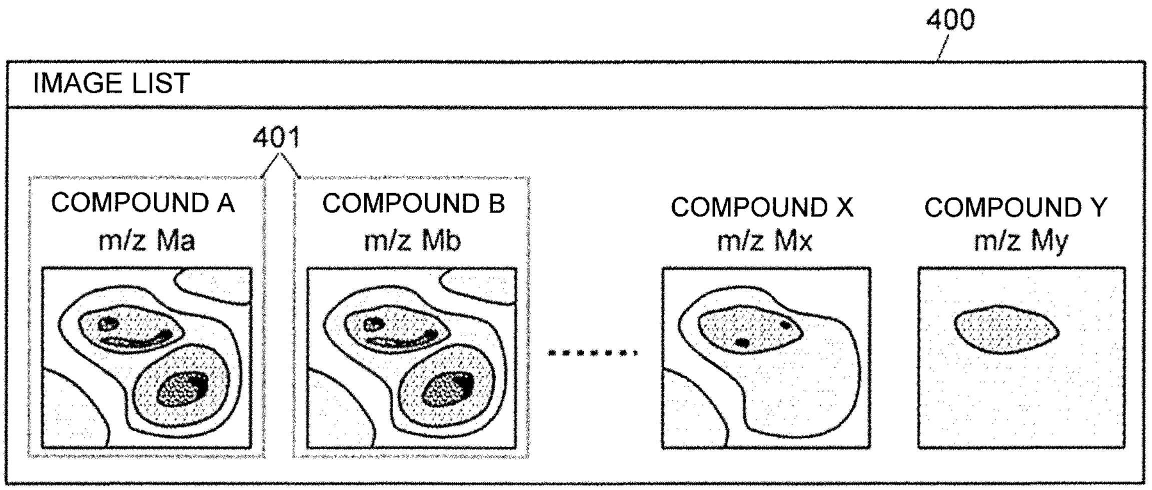

IMAGING MASS SPECTROMETRY DATA PROCESSING DEVICE

CROSS REFERENCE TO RELATED APPLICATIONS

This application is a National Stage of International Application No. PCT/JP2018/020838, filed May 30, 2018,

TECHNICAL FIELD

The present invention relates to an imaging mass spectrometry data processing device that processes mass spectrometry data acquired for each of a large number of micro regions within a two-dimensional region on a sample using an imaging mass spectrometer, and creates and displays an image showing the two-dimensional intensity distribution of a specific substance, for example.

BACKGROUND ART

The imaging mass spectrometer is a device capable of obtaining the two-dimensional intensity distribution of ions with a specific mass-to-charge ratio m/z on a surface of a sample such as a biological tissue section while observing the form of the surface of the same sample with an optical microscope (see Patent Literature 1, Non-Patent Literature 1, and the like). Observing a mass spectrometry image of ions derived from a compound characteristically appearing in a particular disease such as cancer using an imaging mass spectrometer makes it possible to know the spread or the like of the disease. For these reasons, in recent years, research to analyze pharmacokinetic analysis of biological tissue sections or the like, difference in compound distribution in each organ, difference in compound distribution between a pathological site such as cancer and a normal site, or the like has been actively conducted using imaging mass spectrometers.

In the imaging mass spectrometer, mass spectrometry is performed over a predetermined mass-to-charge ratio range for each of a large number of micro regions (measurement points) set in a two-dimensional region on a sample. The data obtained in one micro region is profile spectrum data showing a continuous waveform along the mass-to-charge ratio. In the data processing unit in the imaging mass spectrometer, actually a computer for data processing, the profile spectrum data for each micro region collected by the measurement is stored in the storage device, and information on the sample is derived through various data processing using this data.

In a conventional general imaging mass spectrometry data processing device (hereinafter, simply referred to as "data processing device"), when the user wants to observe a two-dimensional distribution image of a specific compound in a sample, after designating the mass-to-charge ratio value M of the compound and an allowable width of the mass-to-charge ratio (hereinafter, simply referred to as "allowable width") ΔM, the user instructs the execution of the image creation processing. In response to this instruction, the data processing device integrates for each micro region, from the profile spectrum data on each micro region stored in the storage device, the signal strength values within the mass-to-charge ratio range of M±ΔM based on the designated mass-to-charge ratio value M and the allowable width ΔM, thereby calculating the signal strength value corresponding to each micro region, and forming and displaying an image showing the two-dimensional distribution of the signal strength value.

Precise mass values (or theoretical mass values) of various compounds are known and are also recorded in general-purpose databases and the like. Therefore, when the user designates a compound, using such information allows the user to substantially designate the mass-to-charge ratio value M corresponding to the compound. In addition, in some cases, the user may want to observe a two-dimensional intensity distribution of a certain mass-to-charge ratio of an unknown compound but sure to be contained in a sample. In such a case, directly designating the mass-to-charge ratio value and the allowable width enables the two-dimensional intensity distribution image at that mass-to-charge ratio to be displayed.

In general, the user often wants to see the two-dimensional distribution of various compounds contained in the sample at a time. Therefore, in the above data processing device, it is possible to designate the mass-to-charge ratio values M and the allowable widths ΔM of a plurality of compounds at the time of image creation processing. However, a mass-to-charge ratio value is not necessarily specific to a compound. For example, different compounds having the same composition formula are indistinguishable in principle. In addition, there are many compounds having very close molecular weights though their composition formulas are different. When a plurality of such compounds are designated by the user to see a combined two-dimensional distribution image, since the mass-to-charge ratio range of M±ΔM for such plurality of compounds overlaps in whole or in part, an image with almost the same two-dimensional intensity distribution for each compound will be displayed.

In that case, if the user does not accurately grasp the mass-to-charge ratio values of the designated compounds, the user may make a false determination that the spatial distributions of the plurality of compounds are very close though actually one of the compounds is scarcely present in the sample. In addition, the user may make another false determination, in contrast, that the spatial distribution is that of one of the compounds and no other compound is present despite the fact that the designated plurality of compounds are all present in the sample with close spatial distributions.

CITATION LIST

Patent Literature

Patent Literature 1: WO 2017/183086 A1

Non Patent Literature

Non Patent Literature 1: "iMScope TRIO Imaging Mass Microscope", [online], [Searched on Mar. 16, 2018], Shimadzu Corporation, Internet

SUMMARY OF INVENTION

Technical Problem

The present invention has been made to solve the above problems, and its object is to provide an imaging mass spectrometry data processing device that allows the user to accurately grasp the distribution of compounds, and the distribution of ions with a specific mass-to-charge ratio when the user wants to observe a two-dimensional distribution image of a plurality of compounds or a two-dimensional intensity distribution image at a plurality of mass-to-charge ratios.

Solution to Problem

The present invention made to solve the above problems is an imaging mass spectrometry data processing device configured to process mass spectrometry data obtained from each of a plurality of micro regions within a two-dimensional region on a sample, the imaging mass spectrometry data processing device including:

a) an input setting unit configured to allow a user to designate a compound or compounds and/or a mass-to-charge ratio value whose two-dimensional intensity distribution based on the mass spectrometry data is to be observed;

b) a determination unit configured to determine, when there are a plurality of mass-to-charge ratio values corresponding to a compound or compounds designated by the user via the input setting unit and/or when there are a plurality of mass-to-charge ratio values designated by the user via the input setting unit, whether there is an overlap between a plurality of mass-to-charge ratio ranges having a predetermined or designated allowable width for each of the plurality of mass-to-charge ratio values; and c) an information provision unit configured to provide, when the determination unit determines that there is an overlap between a plurality of mass-to-charge ratio ranges, the user with information that mass-to-charge ratio ranges overlap in a compound or compounds and/or a mass-to-charge ratio value designated by a user.

The "mass spectrometry data" in the present invention includes not only simple mass spectrum data that does not involve a dissociation operation for ions, but also $MS^n$ spectrum data obtained by $MS^n$ analysis in which n is 2 or more. In addition, this mass spectrometry data is generally profile spectrum data showing a continuous waveform, but is not limited to this, and for example, data may be used representing a mass spectrum formed into a mountain-shaped peak by providing each bar with a predetermined peak width after being graphed by a bar graph by centroid processing.

When a compound whose two-dimensional intensity distribution is to be observed is determined, the user designates the compound by the input setting unit. The method for designating the compound is not particularly limited. Directly inputting a compound name may be used, selecting a target compound from within the compound list prepared in advance may be used, or designating a compound list itself prepared in advance to collectively designate a plurality of compounds listed on the list may be used. In addition, instead of designating a compound, designating a mass-to-charge ratio value itself may be used. In this case, the compound to be observed may be unknown.

When there are a plurality of mass-to-charge ratio values corresponding to a compound or compounds designated by a user via the input setting unit and/or when there are a plurality of mass-to-charge ratio values designated by a user, the determination unit determines whether there is an overlap between a plurality of mass-to-charge ratio ranges having a predetermined or designated allowable width for each of the mass-to-charge ratio values.

This allowable width may be designated at the same time when the compound or compounds or the mass-to-charge ratio value is designated in the input setting unit. Alternatively, this allowable width may be a predetermined value, or may be calculated for each mass-to-charge ratio value (that is, according to the magnitude of the mass-to-charge ratio value) according to a predetermined calculation formula or algorithm. The mass-to-charge ratio range is a kind of window used when a signal strength value at a designated compound or mass-to-charge ratio value is calculated from mass spectrum data. The area of the peak waveform of the mass spectrum cut out by one mass-to-charge ratio range or the integrated value of the data becomes the signal strength value in the mass-to-charge ratio value in the mass-to-charge ratio range. Therefore, for example, overlap of part of the mass-to-charge ratio range corresponding to two different compounds means that the same part in the peak waveform of the mass spectrum is doubly reflected in the signal strength values of the different compounds.

Thus, if it is determined that there is an overlap between a plurality of mass-to-charge ratio ranges, before creating an image according to the designated conditions, or at the time of displaying the created image on the screen of the display unit, the information provision unit provides information that allows the user to recognize that there is an overlap in the mass-to-charge ratio range in the compound or compounds and mass-to-charge ratio value designated by the user. The method of providing information at this time can take various modes.

As the first aspect of the present invention, the information provision unit issues a warning in a mode recognizable by a user.

When a plurality of mass-to-charge ratio ranges overlap, the user's attention may be drawn by a warning display or a warning sound.

As a second aspect of the present invention, the information provision unit makes a list of compounds and/or mass-to-charge ratio values whose mass-to-charge ratio ranges overlap and displays the list on a screen of a display unit.

Thus, the user can visually check on the display screen specifically the compound or compounds whose mass-to-charge ratio ranges overlap or the mass-to-charge ratios whose mass-to-charge ratio ranges overlap.

As a third aspect of the present invention, the imaging mass spectrometry data processing device further includes an image creation unit configured to create an image showing a two-dimensional intensity distribution using the mass spectrometry data for each of the plurality of mass-to-charge ratio ranges based on designation by a user via the input setting unit. When displaying image information created by the image creation unit on a screen of a display unit, the information provision unit displays an image corresponding to compounds and/or mass-to-charge ratio values whose mass-to-charge ratio ranges overlap in a manner visually distinguishable from another image.

In this third aspect, even if the plurality of mass-to-charge ratio ranges overlap, the image creation unit creates an image showing a two-dimensional intensity distribution for each of the mass-to-charge ratio ranges using mass spectrometric data. For example, when part of the mass-to-charge ratio ranges corresponding to two different compounds overlap, if part of the peak waveform of the mass spectrum is present in the overlapping range, the waveform part is reflected in the signal strength values of both of the two compounds. Therefore, even if one of the two compounds does not exist at all, a false signal strength value will appear for the compound. Thus, when displaying the image information created by the image creation unit on the display screen, the information provision unit displays an image corresponding to compounds whose mass-to-charge ratio ranges overlap so as to be visually distinguishable from an image corresponding to another compound, for example.

For example, a specific mark can be denoted to a plurality of images corresponding to compounds whose mass-to-charge ratio ranges overlap; or a display color of a frame surrounding the plurality of images corresponding to compounds whose mass-to-charge ratio ranges overlap can be different from that of other images. In addition, only a plurality of images corresponding to compounds whose mass-to-charge ratio ranges overlap may be automatically collected and displayed in a predetermined display region in the display screen. In any case, the two-dimensional distribution image of the compound or the like, that is, the mass spectrometry image has only to be displayed in a mode that can be easily visually recognized when viewed by the user on the screen.

As described above, when there is an overlap between the mass-to-charge ratio ranges, not only notifying the user of the information related to it, but also creating an image that reduces the influence of such overlap or creating an image on the premise of the overlap may be used.

As another aspect of the present invention, when the determination unit determines that there is an overlap between a plurality of mass-to-charge ratio ranges, a mass-to-charge ratio range change unit configured to change at least one mass-to-charge ratio range among a plurality of overlapping mass-to-charge ratio ranges in order to eliminate the overlap may be further included.

In this configuration, for example, the mass-to-charge ratio range change unit changes some of the allowable widths in a plurality of overlapping mass-to-charge ratio ranges, thereby narrowing the mass-to-charge ratio range and resulting in eliminating the overlap of the mass-to-charge ratio ranges. Thus, for example, when the foot of the peaks corresponding to two adjacent compounds overlap on the mass spectrum, the peaks can be divided by the same method as the vertical division and each signal strength value can be calculated. Thus, although not perfect, the influence of overlapping of a plurality of mass-to-charge ratio ranges can be reduced and the accuracy of the signal strength value can be improved.

When the composition formulas of a plurality of compounds to be observed are the same, the mass-to-charge ratio ranges of the plurality of compounds completely overlap, and when the mass-to-charge ratio values of both compounds are very close, the difference in the mass-to-charge ratio range of the plurality of compounds may be not more than the limit of device performance. In such a case, it is practically impossible to eliminate the overlap of the overlapping plurality of mass-to-charge ratio ranges.

As still another aspect of the present invention, when the determination unit determines that a plurality of mass-to-charge ratio ranges overlap, the imaging mass spectrometry data processing device merges the plurality of overlapping mass-to-charge ratio ranges, and treats a plurality of compounds and/or mass-to-charge ratio values corresponding to the plurality of mass-to-charge ratio ranges as one constructive component, and an image creation unit may be further included for creating an image showing a two-dimensional intensity distribution using the mass spectrometry data.

According to this configuration, although the two-dimensional intensity distribution of each of the plurality of compounds treated as one constructive component is unknown, it is possible to at least avoid erroneously determining a compound which actually does not exist to exist, or conversely determining a compound which actually exists not to exist. In addition, the two-dimensional intensity distribution of the constructive component can be imaged with high accuracy.

Advantageous Effects of Invention

According to the present invention, when the user desires to observe mass spectrometry images of a plurality of compounds, the user can accurately grasp, for example, that the displayed mass spectrometry image may not be derived from one compound, in other words, the two-dimensional intensity information on other compounds may be mixed, and that conversely it is highly possible that the displayed mass spectrometry image is purely derived from the target compound. Thus, the user can accurately grasp the target compound and the distribution of ions having a specific mass-to-charge ratio.

BRIEF DESCRIPTION OF DRAWINGS

FIGS. 2A-2D are explanatory diagrams of an MS image creation operation in the imaging mass spectrometer of the present embodiment.

FIGS. 3A-3B are a schematic diagram showing the relationship between mass-to-charge ratio ranges when calculating signal strength values of a plurality of compounds adjacent to each other on the m/z axis.

FIG. 4 is a diagram showing an example of a list displaying a plurality of compounds whose mass-to-charge ratio ranges overlap.

FIG. 5 is a diagram showing an example of a display screen for displaying MS images of a plurality of compounds whose mass-to-charge ratio ranges overlap.

DESCRIPTION OF EMBODIMENTS

Hereinafter, an embodiment of an imaging mass spectrometer including the imaging mass spectrometry data processing device according to the present invention will be described with reference to the accompanying drawings.

Figure 1:
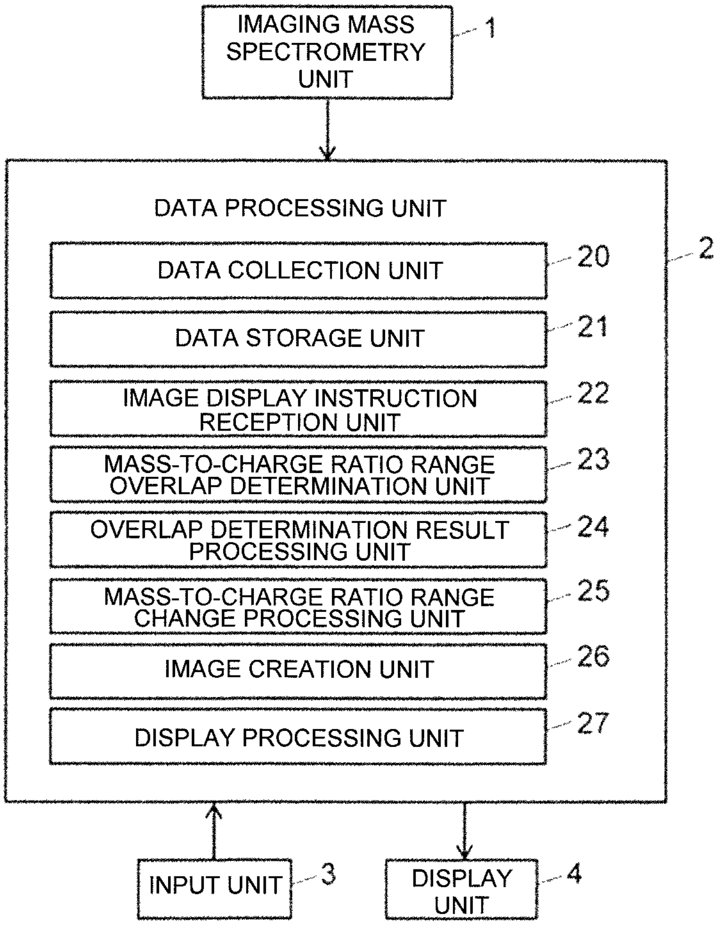
FIG. 1 is a schematic configuration diagram of an embodiment of an imaging mass spectrometer including an imaging mass spectrometry data processing device according to the present invention.

FIG. 1 is a schematic configuration diagram of an imaging mass spectrometer according to the present embodiment, and FIGS. 2A-2D are explanatory diagrams of an MS image creation operation in the imaging mass spectrometer of the present embodiment.

The imaging mass spectrometer of the present embodiment includes an imaging mass spectrometry unit 1 that performs measurement on a sample, a data processing unit 2, and an input unit 3 and a display unit 4 being user interfaces. It should be noted that although not described here, the imaging mass spectrometer also includes an optical microscope image acquiring unit that captures an optical microscope image on the sample.

Figures 2A, 2B, 2D:
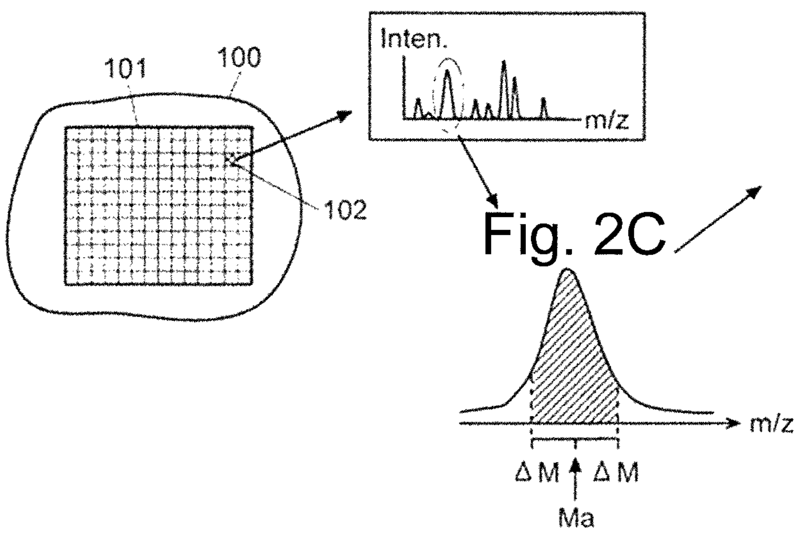

The imaging mass spectrometry unit 1 includes, for example, a matrix-assisted laser desorption/ionization ion trap time-of-flight mass spectrometer, and as shown in FIG. 2A, performs mass spectrometry on each of the large number of measurement points (micro regions) 102 in the two-dimensional measurement region 101 on the sample 100 such as a biological tissue section to acquire mass spectrometry data for each measurement point. Here, the mass spectrometry data is mass spectrum data over a predetermined mass-to-charge ratio range, but may be $MS^n$ spectrum data for a specific precursor ion.

The data processing unit 2 receives the mass spectrum data at each measurement point collected by the imaging mass spectrometry unit 1 to perform predetermined processing, and includes functional blocks such as a data collection unit 20, a data storage unit 21, an image display instruction reception unit 22, a mass-to-charge ratio range overlap determination unit 23, an overlap determination result processing unit 24, a mass-to-charge ratio range change processing unit 25, an image creation unit 26, and a display processing unit 27.

Generally, the substance of the data processing unit 2 is a personal computer (or a higher-performance workstation), and causing the dedicated software installed on the computer to operate on the computer achieves the function of each block described above. In that case, the input unit 3 is a pointing device such as a keyboard or a mouse, and the display unit 4 is a display monitor.

In the imaging mass spectrometer of the present embodiment, when the user (operator) sets the sample 100 at a predetermined measurement position of the imaging mass spectrometry unit 1 and performs a predetermined operation on the input unit 3, an optical microscopic image acquiring unit (not shown) photographs the surface of the sample 100 and displays the image on the screen of the display unit 4. The user designates the desired measurement region 101 on the image with the input unit 3, and then instructs the start of measurement. Then, the imaging mass spectrometry unit 1 executes mass spectrometry on each of a large number of measurement points 102 in the measurement region 101 as shown in FIG. 2A, and acquires mass spectrum data over a predetermined mass-to-charge ratio range. At this time, the data collection unit 20 executes what is called profile acquisition, and collects profile spectrum data being a continuous waveform in the mass-to-charge ratio direction over a predetermined mass-to-charge ratio range as shown in FIG. 2B to store the profile spectrum data in the data storage unit 21. As a matter of course, what is stored in the data storage unit 21 is a string of digitized data on samples of continuous profile waveforms sampled at a predetermined sampling interval (sufficiently smaller than the peak width of the waveform).

After the measurement of the target sample 100 is completed, the user designates the compound whose two-dimensional intensity distribution is desired to be checked (hereinafter referred to as "target compound") in the sample 100 from the input unit 3. Designation of the target compound can be made by a method such as inputting the compound name directly, or selecting a compound from a list of compounds prepared in advance. In addition, when a plurality of target compounds are designated, the target compounds may be designated one by one by the above method, but listing a plurality of target compounds in advance and selecting the list may make it possible to collectively designate the plurality of target compounds on the list.

Instead of designating the target compound, it is also possible to designate the mass-to-charge ratio value (hereinafter referred to as "target mass-to-charge ratio value") itself whose two-dimensional intensity distribution is desired to be checked. For example, the user has only to be able to perform designation by selecting an appropriate peak with a mass-to-charge ratio from the peak list created by performing peak detection on the mass spectrum obtained in the sample. Naturally, the user may be able to directly input the mass-to-charge ratio value. It should be noted that when the target mass-to-charge ratio value is designated, the compound corresponding to the mass-to-charge ratio may be unknown.

Together with designating the target compound and the target mass-to-charge ratio value as the checking target of the two-dimensional intensity distribution, the user designates the allowable width ΔM at the time of calculating the signal strength value. However, when a plurality of target compounds and target mass-to-charge ratio values are designated, the allowable width does not necessarily have to be designated for each target compound and each target mass-to-charge ratio value, and for example, the allowable width may be common to all target compounds and target mass-to-charge ratio values. In addition, the allowable width does not have to be designated with the numerical value of the unit of the mass-to-charge ratio such as "Da" and "u", and may be designated with the ratio to the central mass-to-charge ratio value, such as "ppm". Naturally, other designation methods may be used. What is important is that allowable width of some kind is set for each target compound or each target mass-to-charge ratio.

When the target compound is designated, the image display instruction reception unit 22 refers to the compound database stored in advance or the like, and obtains the precise mass-to-charge ratio value corresponding to the designated compound (normally the theoretical value of the mass-to-charge ratio). Therefore, even when any one of the target compound and the target mass-to-charge ratio value is designated, information on the central mass-to-charge ratio value M and the allowable width ΔM can be obtained for each target compound or for each target mass-to-charge ratio value.

The mass-to-charge ratio range overlap determination unit 23 calculates the mass-to-charge ratio range [M−ΔM to M+ΔM] for integrating the signal strength value from the mass-to-charge ratio value M and the allowable width ΔM for each target compound or each target mass-to-charge ratio value. Then, it is examined whether the mass-to-charge ratio range of all the designated target compounds and the mass-to-charge ratio range of the target mass-to-charge ratio values overlap.

FIG. 3A is an example when there is no overlap between the mass-to-charge ratio range [Ma−ΔM to Ma+ΔM] of a compound A and the mass-to-charge ratio range [Mb−ΔM to Mb+ΔM] of a compound B, which are adjacent to each other on the mass-to-charge ratio axis. On the other hand, FIG. 3B is an example when there is an overlap between the mass-to-charge ratio range [Ma−ΔM to Ma+ΔM] of a compound A and the mass-to-charge ratio range [Mb−ΔM to Mb+ΔM] of a compound B, which are adjacent to each other on the mass-to-charge ratio axis, and the shaded part in the drawing overlaps. The mass-to-charge ratio range overlap determination unit 23 determines the presence or absence of overlap for the entire mass-to-charge ratio range. Naturally, in some cases, the mass-to-charge ratio ranges of three or more compounds may overlap.

When there is no overlap between the mass-to-charge ratio ranges, the image creation unit 26 notified of the result extracts data included in the mass-to-charge ratio range of the target compound and the target mass-to-charge ratio value in the profile spectrum data of each measurement point 102 to read the data from the data storage unit 21, and obtains the signal strength value by integrating the data included in the mass-to-charge ratio range (see FIG. 2C). Thus, since the signal strength values of each of the large number of measurement points 102 included in the measurement region 101 can be obtained for each target compound or each target mass-to-charge ratio value, arranging the signal strength value two-dimensionally according to the position of the measurement point and giving the display color to the signal strength value according to a predetermined color scale creates a heat map-shaped mass spectrometry image 200 as shown in FIG. 2D. The display processing unit 27 displays the mass spectrometry image 200 created for each of the target compound and the target mass-to-charge ratio value on the screen of the display unit 4 in the form of, for example, a list.

On the other hand, when at least one set of a plurality of mass-to-charge ratio ranges has overlap, the overlap determination result processing unit 24 notified of the result executes any one or a plurality of the following pieces of processing at the same time. It should be noted that the user can preferably set in advance what kind of processing is to be executed.

<First Processing> Warning of Overlap of Mass-to-Charge Ratio Ranges

The overlap determination result processing unit 24 displays a warning display on the screen of the display unit 4 indicating that there is an overlap between the mass-to-charge ratio ranges. It should be noted that at the same time, a warning sound or the like may be emitted.

<Second Processing> List Display of Compounds or the Like Whose Mass-to-Charge Ratio Ranges Overlap The overlap determination result processing unit 24 creates a list of target compounds or target mass-to-charge ratio values whose mass-to-charge ratio ranges overlap, and displays the list on the screen of the display unit 4. FIG. 4 is an example of a list when the mass-to-charge ratio ranges of compounds A and B overlap as shown in FIG. 3B. From the displayed list, the user can immediately check, for example, which compound and which compound have the mass-to-charge ratio range overlapping.

In the case of the above first processing and second processing, warnings and lists are displayed, and while leaving the mass-to-charge ratio ranges in a state of having overlap, a mass spectrometry image may be created for each target compound or for each mass-to-charge ratio value as described above, or after automatically changing the mass-to-charge ratio range as described below, a mass spectrometry image may be created for each target compound or for each mass-to-charge ratio value as described above. Alternatively, after warning and lists are displayed, an instruction from the user is awaited, that is, a mass spectrometry image is not immediately created and if it is instructed to create an image by the user, and then a mass spectrometry image may be created.

<Third Processing> Explicit Representation of Overlapping Compounds or the Like on Mass Spectrometry Image Display In response to the instruction of the overlap determination result processing unit 24, the image creation unit 26 creates a mass spectrometry image for each target compound or for each mass-to-charge ratio value as described above while leaving the mass-to-charge ratio ranges in a state of partial overlap. The display processing unit 27 displays the mass spectrometry image created for each of the target compound and the target mass-to-charge ratio value on the screen of the display unit 4 in the form of, for example, a list. At this time, the overlap determination result processing unit 24 denotes a mark or the like such that the mass spectrometry image corresponding to the target compounds or the target mass-to-charge ratio values whose mass-to-charge ratio ranges overlap is distinguishable from another mass spectrometry image (that is, there is no overlap between the mass-to-charge ratio ranges) on the display.

FIG. 5 is a diagram showing an example of a mass spectrometry image list when the mass-to-charge ratio ranges of compounds A and B overlap as shown in FIG. 3B. In this example, thumbnail images of mass spectrometry images of a plurality of target compounds designated by the user are arranged side by side in the image list screen 400. Among them, the mass spectrometry images of compounds A and B whose mass-to-charge ratio ranges overlap are surrounded by a frame 401 of the same display color. Thus, the user can recognize at a glance the mass spectrometry images of the target compounds and target mass-to-charge ratio values, whose mass-to-charge ratio ranges overlap. Naturally, instead of the frame 401 as shown in FIG. 5, marks and symbols having any shape such as arrows can be used. In addition, the images may be appropriately rearranged and displayed so that the mass spectrometry images of the target compounds and target mass-to-charge ratio values, whose mass-to-charge ratio ranges overlap, fall within the same frame. In any case, the mass spectrometry images of the target compounds and target mass-to-charge ratio values whose mass-to-charge ratio ranges overlap have only to be displayed in such a manner that they can be easily distinguished from other images.

As described above, when a mass spectrometry image is created in a state of the mass-to-charge ratio ranges of compounds A and B overlapping, the signal strength value of the part where the mass-to-charge ratio ranges overlap is doubly reflected in both the mass spectrometry image of the compound A and the mass spectrometry image of the compound B. Actually, the signal strength value of the overlapping portion is the signal strength value of any one of the compounds A and B, or should be distributed to both compounds A and B at an appropriate ratio. Therefore, in any case, the accuracy of the two-dimensional intensity distribution of the mass spectrometry image is lowered. Thus, in order to create a more accurate mass spectrometry image, it is necessary for the user to manually change the allowable width, for example, so that the mass-to-charge ratio ranges do not overlap. However, if mass spectrometry images of a large number of compounds are desired to be observed at once, the number of compounds with overlapping mass-to-charge ratio ranges also increases, and it is troublesome to manually eliminate the overlap of the mass-to-charge ratio ranges one by one.

Figure 6A:
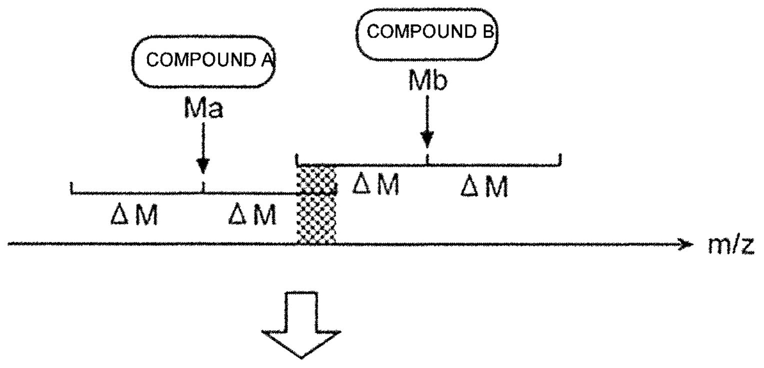
FIGS. 6A-6B are schematic diagrams for illustrating the operation when changing the mass-to-charge ratio ranges corresponding to a plurality of compounds adjacent to each other on the m/z axis.
Figure 6B:
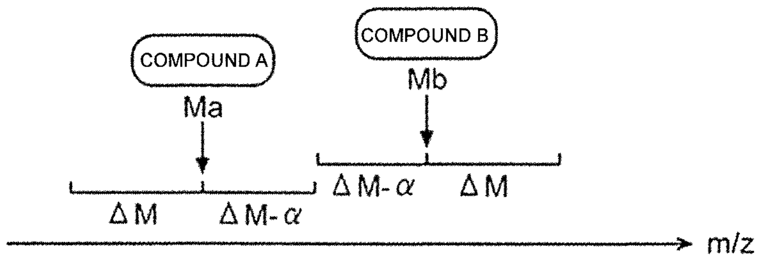
Figure 7A:
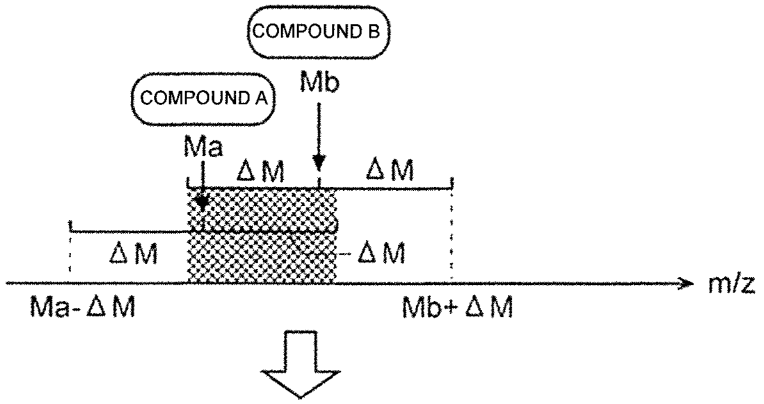
FIGS. 7A-7B are schematic diagrams for illustrating the operation when merging the mass-to-charge ratio ranges corresponding to a plurality of compounds adjacent to each other on the m/z axis.
Figure 7B:
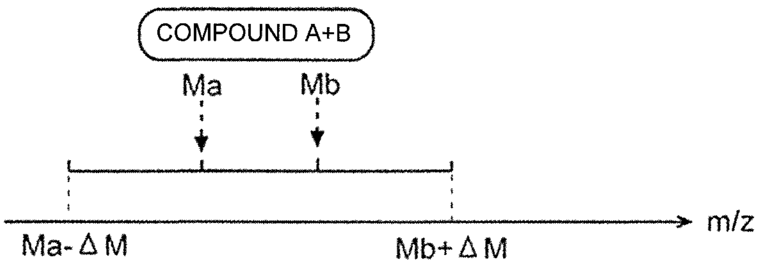

In the device of the present embodiment, when the user performs a predetermined operation from the input unit 3, the mass-to-charge ratio range change processing unit 25 implements processing of automatically changing the mass-to-charge ratio range so that the overlap of the mass-to-charge ratio ranges is eliminated. FIGS. 6A-6B are schematic diagrams for illustrating the operation when changing the mass-to-charge ratio ranges corresponding to a plurality of compounds adjacent to each other on the m/z axis, and FIGS. 7A-7B are schematic diagrams for illustrating the operation when merging the mass-to-charge ratio ranges corresponding to a plurality of compounds adjacent to each other on the m/z axis.

The mass-to-charge ratio range change processing unit 25 first obtains the width of the overlap when an execution of processing for eliminating the overlap between the mass-to-charge ratio ranges of the two compounds A and B is instructed. Then, it is determined whether the overlapping width is not less than a predetermined value smaller than the allowable width ΔM. If the overlapping width is less than a predetermined value, as shown in FIGS. 6A-6B, the overlapping portion is divided and distributed to both sides of the divided point to reduce the allowable width. In the example in FIG. 6B, the mass-to-charge ratio range is changed by reducing the respective allowable widths on both sides of the overlapping portion by α.

Ideally, since the peak shape of the profile spectrum is also a Gaussian distribution shape, the peak shape is bilaterally symmetrical. Therefore, the allowable width of each target compound may be set to ΔM−Δ. In addition, when the allowable widths on both sides of the overlapping portion are different, it is preferable to change the distribution to both sides according to the ratio of the allowable widths.

In this way, after changing the mass-to-charge ratio range so that there is no overlap, integrating the data included in the mass-to-charge ratio range for each measurement point as described above obtains the signal strength value and creates a mass spectrometry image. Thus, it is possible to obtain a more accurate mass spectrometry image that reduces the influence of the overlap of the mass-to-charge ratio range.

On the other hand, when the overlapping width of the mass-to-charge ratio range is not less than a predetermined value smaller than the allowable width ΔM, narrowing the mass-to-charge ratio range so as to eliminate the overlap reduces the signal strength value being the result of integration, which is disadvantageous in sensitivity. In addition, as shown in FIG. 7A, when the overlap is large, it is practically impossible to separate them. In that case, as shown in FIG. 7B, the overlapping mass-to-charge ratio ranges are merged and treated as the mass-to-charge ratio range of the mixture of the compound A and compound B.

In this way, after merging and enlarging the mass-to-charge ratio range, integrating the data included in the mass-to-charge ratio range for each measurement point as described above obtains the signal strength value and creates a mass spectrometry image. Thus, a mass spectrometry image showing a two-dimensional intensity distribution of a mixture of the compound A and the compound B can be obtained. In this case, the individual two-dimensional intensity distribution of each of compound A and compound B is not known, but the two-dimensional intensity distribution of a mixture of the two compounds can be accurately obtained.

It should be noted that the above embodiment is an example of the present invention, and even if appropriate changes, amendments, and additions are made within the scope of the gist of the present invention, it is natural that those are included in the claims of the present application.

REFERENCE SIGNS LIST

1 . . . Imaging Mass Spectrometry Unit
2 . . . Data Processing Unit
20 . . . Data Collection Unit
21 . . . Data Storage Unit
22 . . . Image Display Instruction Reception Unit
23 . . . Mass-To-Charge Ratio Range Overlap Determination Unit
24 . . . Overlap Determination Result Processing Unit
25 . . . Mass-To-Charge Ratio Range Change Processing Unit
26 . . . Image Creation Unit
27 . . . Display Processing Unit
3 . . . Input Unit
4 . . . Display Unit
100 . . . Sample
101 . . . Measurement Region
102 . . . Measurement Point
200 . . . Mass Spectrometry Image
400 . . . Image List Screen
401 . . . Frame

The invention claimed is:

1. An imaging mass spectrometry data processing device configured to process mass spectrometry data obtained by performing mass spectrometry using a mass spectrometer on each of a plurality of micro regions within a two-dimensional region on a sample, the imaging mass spectrometry data processing device comprising:

a) an input setting unit configured to allow a user to designate a compound or compounds or a mass-to-charge ratio value whose two-dimensional intensity distribution based on the mass spectrometry data is to be observed;

b) a mass-to-charge ratio range overlap determination unit configured to determine, when there are a plurality of mass-to-charge ratio values corresponding to a compound or compounds designated by the user via the input setting unit and/or when there are a plurality of mass-to-charge ratio values designated by a user via the input setting unit, whether there is an overlap between a plurality of mass-to-charge ratio ranges having a predetermined or designated allowable width for each of the plurality of mass-to-charge ratio values; and c) an overlap determination result processing unit configured to provide, when the mass-to-charge ratio range overlap determination unit determines that there is an overlap between a plurality of mass-to-charge ratio ranges, the user with information that mass-to-charge ratio ranges overlap in a compound or compounds or a mass-to-charge ratio value designated by a user.

2. The imaging mass spectrometry data processing device according to claim 1, wherein the overlap determination result processing unit issues a warning in a mode recognizable by a user.

3. The imaging mass spectrometry data processing device according to claim 1, wherein the overlap determination result processing unit lists and displays on a screen of a display unit compounds and/or mass-to-charge ratio values whose mass-to-charge ratio ranges overlap.

4. The imaging mass spectrometry data processing device according to claim 1, further comprising an image creation unit configured to create an image showing a two-dimensional intensity distribution using the mass spectrometry data for each of the plurality of mass-to-charge ratio ranges based on designation by a user via the input setting unit, and wherein when displaying image information created by the image creation unit on a screen of a display unit, the overlap determination result processing unit displays an image corresponding to compounds and/or mass-to-charge ratio values whose mass-to-charge ratio ranges overlap in a manner visually distinguishable from another image.

5. The imaging mass spectrometry data processing device according to claim 1, further comprising, a mass-to-charge ratio range change processing unit configured to change at least one mass-to-charge ratio range among a plurality of overlapping mass-to-charge ratio ranges in order to eliminate the overlap, when the mass-to-charge ratio range overlap determination unit determines that there is an overlap between a plurality of mass-to-charge ratio ranges.

6. The imaging mass spectrometry data processing device according to claim 1, wherein when the mass-to-charge ratio range overlap determination unit determines that a plurality of mass-to-charge ratio ranges overlap, the imaging mass spectrometry data processing device merges a plurality of overlapping mass-to-charge ratio ranges, and treats a plurality of compounds and/or mass-to-charge ratio values corresponding to the plurality of mass-to-charge ratio ranges as one constructive component.

* * * * *